US009207882B2

(12) United States Patent
Rosset et al.

(10) Patent No.: US 9,207,882 B2
(45) Date of Patent: Dec. 8, 2015

(54) SYSTEM AND METHOD FOR IN-BAND LUN PROVISIONING IN A DATA CENTER NETWORK ENVIRONMENT (71) Applicants: Sebastien T. Rosset, Sunnyvale, CA (US); Brian Y. Uchino, Foster City, CA (US); Sesidhar Baddela, Cupertino, CA (US)

(72) Inventors: Sebastien T. Rosset, Sunnyvale, CA (US); Brian Y. Uchino, Foster City, CA (US); Sesidhar Baddela, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 332 days.

(21) Appl. No.: 13/718,425

(22) Filed: Dec. 18, 2012

(65) Prior Publication Data

US 2014/0173195 A1 Jun. 19, 2014

(51) Int. Cl.
*G06F 12/00* (2006.01)
*G06F 3/06* (2006.01)
*G06F 9/44* (2006.01)
*G06F 13/14* (2006.01)
*G06F 13/38* (2006.01)
*G06F 13/00* (2006.01)

(52) U.S. Cl.
CPC ............ *G06F 3/0689* (2013.01); *G06F 9/4405* (2013.01); *G06F 13/00* (2013.01); *G06F 13/14* (2013.01); *G06F 13/38* (2013.01)

(58) Field of Classification Search
None
See application file for complete search history.

(56) References Cited

U.S. PATENT DOCUMENTS

| | | | |
|---|---|---|---|
| 5,812,950 A | 9/1998 | Tom | |
| 5,838,970 A | 11/1998 | Thomas | |
| 6,976,090 B2 | 12/2005 | Ben-Shaul et al. | |
| 7,697,554 B1 | 4/2010 | Ofer et al. | |
| 7,706,303 B2 | 4/2010 | Bose et al. | |
| 7,757,059 B1 | 7/2010 | Ofer et al. | |
| 7,793,138 B2 | 9/2010 | Rastogi et al. | |
| 7,843,906 B1 | 11/2010 | Chidambaram et al. | |
| 7,904,599 B1 | 3/2011 | Bennett | |
| 7,930,494 B1 * | 4/2011 | Goheer et al. | 711/159 |
| 8,031,703 B2 | 10/2011 | Gottumukkula et al. | |
| 8,161,134 B2 | 4/2012 | Mishra et al. | |
| 8,218,538 B1 | 7/2012 | Chidambaram et al. | |
| 8,230,066 B2 | 7/2012 | Heil | |
| 8,274,993 B2 | 9/2012 | Sharma et al. | |
| 8,335,231 B2 | 12/2012 | Kloth et al. | |

(Continued)

OTHER PUBLICATIONS

U.S. Appl. No. 13/593,229, filed Aug. 23, 2012 entitled "System and Method for Policy Based Fibre Channel Zoning for Virtualized and Stateless Computing in a Network Environment," Inventors: Sebastien T. Rosset, et al.

(Continued)

*Primary Examiner* — Midys Rojas
(74) *Attorney, Agent, or Firm* — Patent Capital Group (57) ABSTRACT A method is provided in one example embodiment and includes instantiating a virtual adapter on a network device connected to a storage array, the virtual adapter capable of communicating with the storage array; determining storage configuration properties for the network device; and provisioning a portion of the storage array to the network device in accordance with the determined storage configuration properties. The method may further comprise associating the network device with a service profile, where the storage configuration properties are specified in the service profile. Still further, the method may comprise configuring the network device in accordance with the associated service profile, where the instantiating is also performed in accordance with the associated service profile.

18 Claims, 5 Drawing Sheets (56) References Cited

U.S. PATENT DOCUMENTS

| | | | |
|---|---|---|---|
| 2006/0251111 | A1 | 11/2006 | Kloth et al. |
| 2011/0022691 | A1 | 1/2011 | Banerjee et al. |
| 2013/0036212 | A1 | 2/2013 | Jibbe et al. |
| 2013/0138836 | A1 | 5/2013 | Cohen et al. |
| 2013/0163606 | A1 | 6/2013 | Bagepalli et al. |
| 2013/0212130 | A1 | 8/2013 | Rahnama |

OTHER PUBLICATIONS

U.S. Appl. No. 14/033,361, filed Sep. 20, 2013 entitled "Hybrid Fibre Channel Storage with End-to-End Storage Provisioning and External Connectivity in a Storage Area Network Environment," Inventor(s): Sebastien T. Rosset, et al.

"Appendix D: Configuring In-Band Management," Sun Storage Common Array Manager Installation and Setup Guide, Version 6.7.x 821-1362-10, Sun Oracle; 15 pages; Copyright © 2010, Oracle and/or its affiliates. All rights reserved. [Retrieved and printed Sep. 12, 2013] http://docs.oracle.com/cd/E19377-01/821-1362-10/inband.html.

"Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013 http://publib.boulder.ibm.com/infocenter/svc/ic/index.jsp?topic=%2Fcom.ibm.storage.svc.console.doc%2Fsvc_fastcontconfint_1ev5ei.html.

"Coraid Virtual DAS (VDAS) Technology: Eliminate Tradeoffs between DAS and Networked Storage," Coraid Technology Brief, © 2013 Coraid, Inc., Published on or about Mar. 20, 2013; 2 pages http://san.coraid .com/rs/coraid/images/TechBrief-Coraid_VDAS.pdf.

"EMC Unisphere:Innovative Approach to Managing Low-End and Midrange Storage; Redefining Simplicity in the Entry-Level and Midrange Storage Markets," Data Sheet, EMC Corporation; 6 pages; © 2013 EMC Corporation. All Rights Reserved. Published on or about Jan. 4, 2013 [Retrieved and printed Sep. 12, 2013] http://www.emc.com/storage/vnx/unisphere.htm.

"HP XP Array Manager Software—Overview & Features," Storage Device Management Software; Hewlett-Packard Development Company, 3 pages; © 2013 Hewlett-Packard Development Company, L.P. http://h18006.www1.hp.com/products/storage/software/amsxp/index.html.

"N-Port Virtualization in the Data Center," Cisco White Paper, Cisco Systems, Inc., Mar. 2008, 6 pages http://www.cisco.com/en/US/prod/collateral/ps4159/ps6409/ps5989/ps9898/white_paper_c11-459263.html.

"VBlock Solution for SAP: Simplified Provisioning for Operation Efficiency," VCE White Paper, VCE—The Virtual Computing Environment Company, Aug. 2011; 11 pages; © 2011 VCE Company LLC. All Rights reserved. http://www.vce.com/pdf/solutions/vce-sap-simplified-provisioning-white-paper.pdf.

Hosterman, Cody, et al., "Using EMC Symmetrix Storage in VMware vSphere Environments," Version 8.0, $EMC^2$ Techbooks, EMC Corporation; published on or about Jul. 8, 2008, 314 pages; [Retrieved and printed Sep. 12, 2013] http://www.emc.com/collateral/hardware/solution-overview/h2529-vmware-esx-svr-w-symmetrix-wp-ldv.pdf.

Swami, Vijay, "Simplifying SAN Management for VMWare Boot from SAN, Utlizing Cisco UCS and Palo," posted May 31, 2011; 6 pages http://virtualeverything.wordpress.com/2011/05/31/simplifying-san-management-for-vmware-boot-from-san-utilizing-cisco-ucs-and-palo/.

USPTO Jul. 9, 2014 Non-Final Office Action from U.S. Appl. No. 13/593,229.

USPTO Dec. 22, 2014 Final Office Action from U.S. Appl. No. 13/593,229.

USPTO Apr. 28, 2015 Non-Final Office Action from U.S. Appl. No. 13/593,229.

* cited by examiner

SYSTEM AND METHOD FOR IN-BAND LUN PROVISIONING IN A DATA CENTER NETWORK ENVIRONMENT

TECHNICAL FIELD

This disclosure relates generally to techniques for provisioning storage in a data center network and, more particularly, to techniques for in-band LUN provisioning in a data center network including a fibre channel fabric.

BACKGROUND

Provisioning storage on a fibre channel ("FC") fabric involves many operations that are typically required to be performed manually or semi-manually. Server administrators generally inventory servers and FC storage adapters, have a process to maintain the inventory up-to-date, and share inventory data with storage administrators. Server and storage administrators exchange information about storage requirements for each server. The storage administrator may then create LUNs, provision LUN masking, and configure FC zones. The storage configuration should be maintained up-to-date to keep up with changes made by server administrators. When hardware components, such as servers or storage disks, are replaced, the storage administrator may have to manually re-configure FC zones and/or LUN masking.

In particular, users need to ensure storage configurations do not become stale; therefore, provisioning should be performed when servers are added or removed and when FC storage ports are added or removed. With the advent of virtualization, stateless computing, and cloud-based infrastructures, changes to the compute and storage infrastructure are more frequent, which increases the complexity of storage provisioning tasks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes instantiating a virtual adapter on a network device connected to a storage array, the virtual adapter capable of communicating with the storage array; determining storage configuration properties for the network device; and provisioning a portion of the storage array to the network device in accordance with the determined storage configuration properties. The method may further comprise associating the network device with a service profile, wherein the storage configuration properties are specified in the service profile. Still further, the method may comprise configuring the network device in accordance with the associated service profile, wherein the instantiating is also performed in accordance with the associated service profile. In one embodiment, the determining further comprises accessing a service profile associated with the network device, wherein the service profile specifies the storage configuration properties for the network device. The provisioning may further comprise accessing a universal transport mechanism ("UTM") logical unit number ("LUN") of the storage array to perform LUN creation and masking. In one embodiment, the accessing is performed by the virtual adapter via an in-band connection between the network device and the storage array.

The storage configuration properties may include at least one of an amount of storage to be provisioned to the network device; a number of disks of the storage array to expose to the network device; a capacity of each disk of the storage array exposed to the network device; whether access to each disk of the storage array exposed to the network device should be shared or exclusive; a RAID level of each disk of the storage array exposed to the network device; and information regarding optimization of disk space use. The network device may comprise a server for hosting virtual machines and the virtual adapter may comprise a virtual host bus adapter ("vHBA") that is transparent to an operating system of the server.

Example Embodiments

As will be described in detail below, in one embodiment, in-band LUN provisioning tasks may be performed in connection with a storage array through a Universal Transport Mechanism ("UTM") LUN from a dynamically provisioned management virtual host bus adaptor ("vHBA") instantiated on a virtualized adapter. Additional storage array management commands may also be supported.

To configure LUNs on the storage array, a management subsystem module, which may be executing on a switching device, such as a fabric interconnect, instantiates a management vHBA on the virtualized adapter. For security reasons, the vHBA may optionally be hidden from the operating system ("OS") or hypervisor running on the server. The storage provisioning module installed on the virtualized adapter is able to communicate with a UTM LUN of the storage array. The storage provisioning module can send commands to the UTM LUN via the management vHBA to create LUNs and configure LUN masking. Because the management vHBA is instantiated from a virtualized adapter, there is no need to dedicate a server for storage management tasks.

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
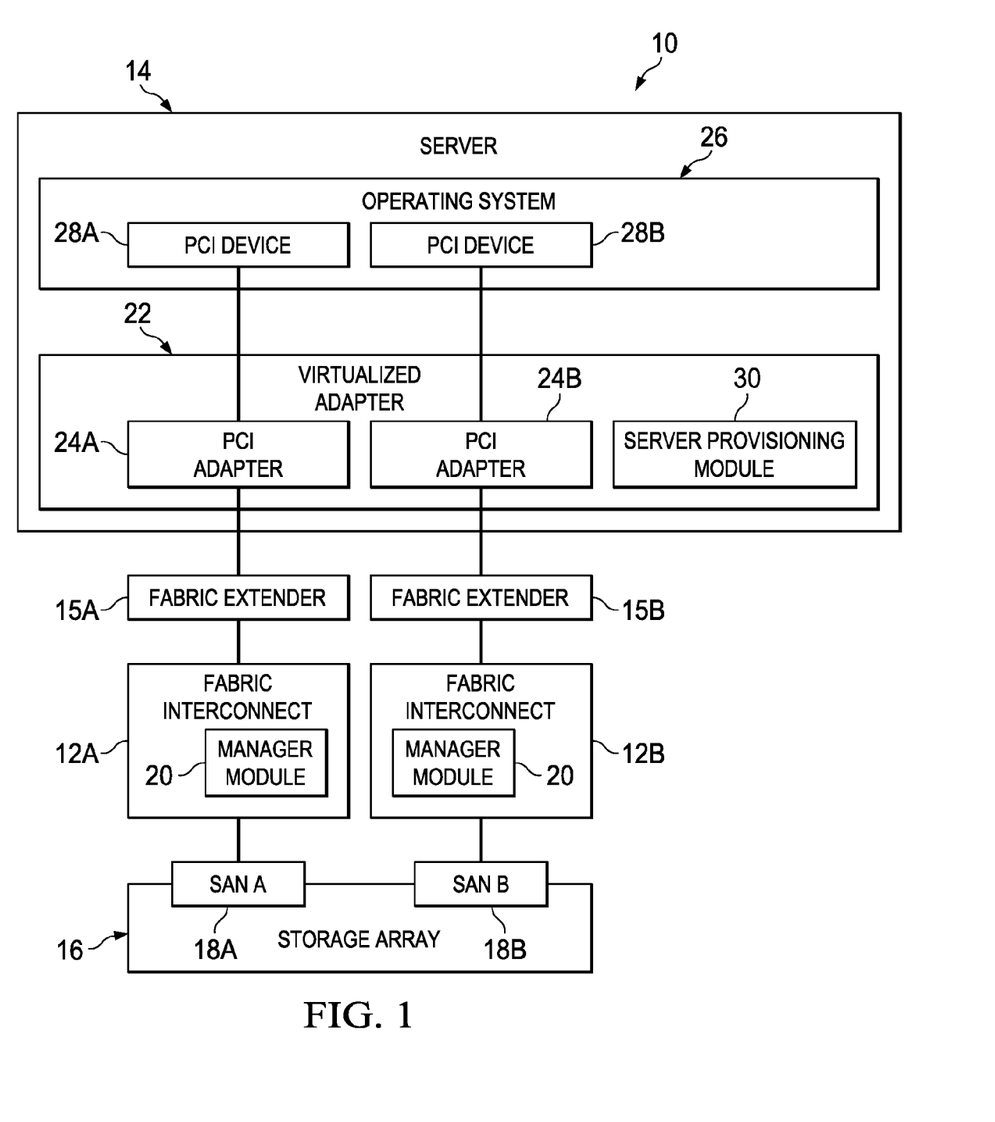
FIG. 1 is a simplified block diagram of a system for implementing in-band LUN provisioning in a data center network environment in accordance with one embodiment.

Turning to FIG. 1, illustrated therein is a simplified block diagram of a system 10 for implementing in-band LUN provisioning in a data center network environment in accordance with one embodiment. As shown in FIG. 1, the system 10 includes a pair of switching devices 12A, 12B, for connecting a server 14 to external storage devices arranged as a storage array 16. The switching devices 12A, 12B, may be implemented as fabric interconnects, which as described in detail below support both FC and Ethernet protocols. Additionally, although not necessary to operation of the system 10, one or more fabric extenders 15A, 15B, may also be provided. The primary function of the fabric extenders 15A, 15B, is to increase the number of physical ports available in the system 10, thereby increasing the number of servers, such as the server 14 that may be connected to the system. The servers, including the server 14, may be connected to the switching devices 12A, 12B, either directly or through the fabric extenders 15A, 15B.

In one embodiment, the storage array 16 includes a first SAN 18A, to which the server 14 is connected via the switch 12A, and a second SAN 18B, to which the server 14 is connected via the switch 12B. Each SAN 18A, 18B, may comprise a dedicated network for providing access to consolidated data storage. In general, SANs make storage devices, such as disk arrays, for example, accessible to servers in a manner in which the storage devices appear to be logically attached to the server. The storage arrays may export/support logical unit numbers ("LUNs"). A LUN is a number used to identify a logical unit, which is a device addressed by the SCSI protocol or protocols that encapsulate SCSI, such as FC or iSCSI. SANs typically have their own network of storage devices that are generally not accessible by other devices through a local area network ("LAN"). In accordance with embodiments described herein, the server 14 may be booted from the SAN 18A or the SAN 18B.

In one embodiment, the system 10 is implemented in accordance with the Cisco Unified Computing System ("UCS") architecture developed by Cisco Systems, Inc., of San Jose, Calif. In general, UCS is data center platform that unites compute, network storage access, and virtualization into a single cohesive system designed to decrease implementation costs and increase agility. UCS may support automatic in-band discovery of computers, or servers, and their components, including FC storage adapters. Further, UCS may maintain an inventory of the discovered servers, monitoring the health of the discovered servers. These processes occur without the user being required to enter any device credentials. Additionally, UCS may provide inventory reports to users and provides a role-based access control ("RBAC") system, such that provisioning tasks can be separated, for example between server administrators and storage administrators. A fully redundant UCS system includes two independent fabric planes: Fabric A and Fabric B. Each plane includes a central fabric interconnected connected to an input/output ("I/O") module, implemented as a fabric extender, in each blade server chassis. The two fabric interconnects are completely independent from the perspective of the data plane. Cisco UCS can function with a single fabric interconnect if the other fabric is offline or not provisioned.

UCS is inherently stateless, with logical configuration specifications referred to as service profiles dictating every aspect of server provisioning, including I/O configurations, firmware revisions, and settings, thereby speeding up virtual infrastructure provisioning. Once created, a service profile can be deployed on any physical server that supports the logical configuration requirements. The service profile may also specify whether to use the world-wide name ("WWN") addresses burned in the server hardware or to substitute virtual WWN addresses therefor. Logical servers can be defined even if no physical server is connected. In this manner, UCS enables logical servers to be deployed over physical servers, which causes the physical server to be configured as specified in the service profile, including WWN addresses for storage adapters. UCS uses a standards-based, low-latency, high-bandwidth 10 Gigabit Ethernet and Fibre Channel over Ethernet ("FCoE") network for traffic, communications, and storage. UCS thereby simplifies connectivity to the storage array by interconnecting UCS servers as a single system and linking that system directly to the Ethernet and FC aggregation layer.

In one embodiment, the compute component of UCS comprises a powered server chassis and multiple full or half slot blade servers. The compute hardware is managed by a management subsystem module 20 embedded in each of the fabric interconnects 12A, 12B, for purposes that will be described in greater detail hereinbelow. In one embodiment, the management subsystem module 20 is implemented as a UCS manager available from Cisco Systems, Inc., UCS supports a variety of hypervisors, including, for example, VMware ESX and ESXi, both available from VMware, Inc., of Palo Alto, Calif., Hyper-V, available from Microsoft Corporation of Redmond, Wash., and XenServer, available from Citrix Systems, Inc., of Fort Lauderdale, Fla., to name just a few.

As previously noted, the fabric interconnects 12A, 12B, which may be implemented using Nexus 6100 or 6200 series switches, available from Cisco Systems, Inc., may provide network connectivity for the servers connected to it through 10 Gigabit and fiber channel over Ethernet ("FCoE"). The FCoE component is used for connecting to the storage array since the servers typically have very little storage themselves. Each fabric interconnect can further connect to multiple fabric extenders, which may be implemented using Nexus 2100 series fabric interconnects comprising port extenders allowing up to 160 servers to be managed by a single fabric interconnect. In one embodiment, each fabric interconnect includes physical ports to which up to 20 server chassis, which may be implemented using Cisco 5100 series blade server chassis, can be connected. Each chassis can hold up to eight ½ width blade servers or four full width blade servers; therefore, a total of up to 160 (½ blade) servers can be connected to each switch.

In a UCS system, system devices are managed via the management subsystem modules 20 embedded in the fabric interconnects 18A, 18B. The fabric interconnects may be accessed by a server administrator through an Internet browser, such as Microsoft Internet Explorer or Firefox, for example, through a CLI management program, or through an API. Virtual machines ("VMs") may be moved from one physical chassis to another. Similarly, applications can be moved between VMs.

UCS is a stateless computing system. In particular, each compute node has no set configuration. MAC addresses, UUIDs, firmware, and BIOS settings, for example, may be configured via the management subsystem module via service profiles applied to the servers, such as the server 14. This enables consistent configuration and facilitates repurposing of servers, as a new service profile can be applied to a server in a manner of minutes.

Referring again to FIG. 1, in accordance with features of one embodiment, the server 14 includes a virtualized adapter 22, which is a physical adapter that can perform PCI virtualization by dynamically instantiating PCI devices on the server. The virtualized adapter 22 may be designed for both single OS and VM-based deployments, supporting network interface virtualization and VN-link capable hypervisor integration. In particular, the virtualized adapter 22 can be used to provision more than 100 virtual PCI adapters, represented in FIG. 1 by adapters 24A, 24B, which may comprise virtual network interface cards ("vNICs") and virtual host bus adapters ("vHBAs"), each of which has its own characteristics and can be used for networking or storage. In the illustrated embodiment, each adapter 24A, 24B, is exposed to an OS 26 of the server 14 as a PCI device 28A, 28B. In one embodiment, the virtualized adapter is implemented as a Cisco UCS 1280 virtual interface card ("VIC") available from Cisco Systems, Inc. For purposes that will be explained in detail below, one embodiment of the system 10 includes a storage provisioning module 30 embedded in and executed by the virtualized adapter 22.

As previously noted, in one embodiment, the virtualized adapter 22 is capable of instantiating multiple FC vHBAs and/or multiple Ethernet vNICs from a single physical adapter (i.e., adapter 22). In one embodiment, the OS 26 may comprise a bare metal hypervisor. In another embodiment, such as that illustrated in FIG. 1, the OS 26 may be implemented on bare metal, in which case a hypervisor (not shown) would be implemented on top of the OS 26. In either case, in a standard SAN deployment, the virtualized adapter may instantiate one or more vHBAs on the server. vHBAs exposed to the bare-metal OS or hypervisor are used to send and receive FC traffic. Similarly, the virtualized adapter may instantiate one or more vNICs on the server. vNICs exposed to the bare-metal OS or hypervisor are used to send and receive Ethernet traffic.

In one embodiment, the management subsystem module 20 exposes a compute and storage abstraction to the user. In particular, the management subsystem module 20 provides a single point of management for compute and storage provisioning. In one embodiment, service profiles comprise the fundamental mechanism by which the system 10 models the abstractions of computer, storage, and networking. Conceptually, a service profile is an extension of the VM abstraction applied to physical servers. The definition has been expanded to include elements of the environment that span the entire data center, encapsulating the server identity in logical service profiles that can be dynamically created and associated with any physical server in the system within minutes. The association of service profiles with physical servers is performed as a simple, single operation and enables migration of identities between servers without requiring any physical configuration changes and facilitates rapid bare-metal provisioning of replacements for failed servers. Every server that is provisioned in the system 10 is specified by a service profile. A service profile is a software definition of a server and its LAN and SAN network connectivity; in other words, a service profile defines a single server and its storage and networking characteristics. Service profiles are stored in the fabric interconnects. When a service profile is deployed to a server, the management subsystem module automatically configures the server, adapters, fabric extenders, and fabric interconnects to match the configuration specified in the service profile. This automation of device configuration reduces the number of manual steps required to configure servers, network interface cards ("NICs"), host bus adapters ("HBAs"), and local area network ("LAN") and SAN switches.

Figure 2:
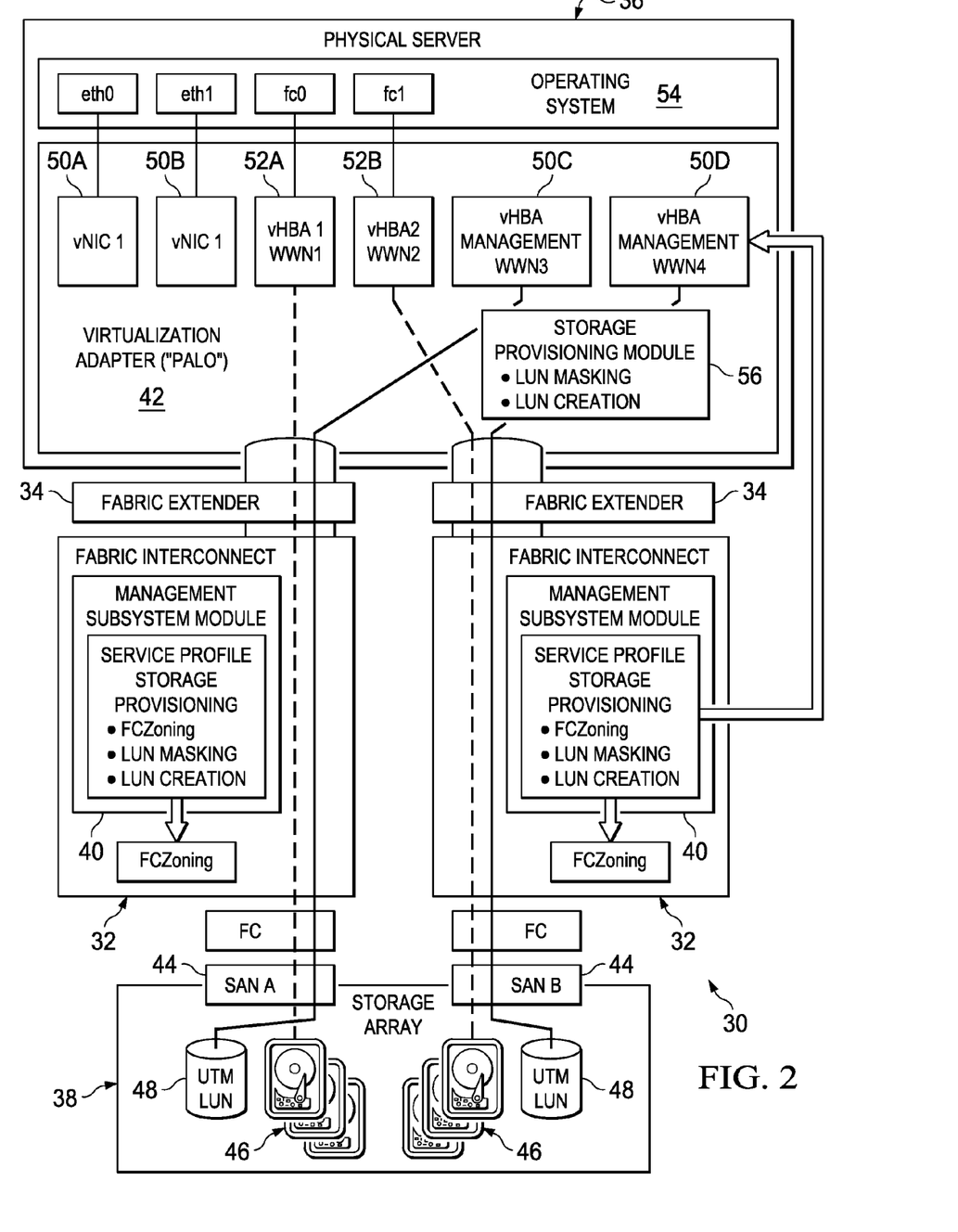
FIG. 2 is a more detailed block diagram of a system for implementing in-band LUN provisioning in a data center network environment in accordance with one embodiment.

Referring now to FIG. 2, FIG. 2 is a more detailed block diagram of a system 30 for enabling in-band LUN provisioning in a data center network in accordance with one embodiment. Similar to the system 10, the system 30 includes fabric interconnects 32 that support FC and Ethernet protocols and optional fabric extenders 34. The system 30 also includes one or more physical servers, represented in FIG. 2 by a single server 36, connected to the fabric interconnects 32 either directly or through fabric extender 34 connections. As shown in FIG. 2, and as will be described in detail herein below, the switches 32, 34, connect the servers 36 to external FC storage devices comprising a storage array 38.

As shown in FIG. 2, a management subsystem module 40 is provided on fabric interconnects 32 for purposes that will be described in detail below. Similar to the management subsystem module 20, the module 40 may be implemented as a UCS manager, available from Cisco Systems, Inc. Additionally, each of the servers 36 is provided with a virtualized adapter 42, which is a physical adapter that can dynamically instantiate HBA PCI devices. In one embodiment, the virtualized adapter is implemented as a Cisco UCS 1280 virtual interface card ("VIC") available from Cisco Systems, Inc., of San Jose, Calif.

In the illustrated embodiment, the storage array 38 includes two ports and two storage area networks ("SANs") 44, designated SAN A and SAN B. Each SAN 44 includes a plurality of disk drives 46 that may be provisioned as LUNs. Each port also includes a UTM LUN 48. Each UTM LUN 48, which may also referred to as an "access LUN," a "management LUN," or a "gatekeeper," is a special LUN that enables storage array management over an FC connection. The UTM LUNs 48 may support LUN creation and deletion, LUN masking, LUN cloning, and LUN resizing. The UTM LUNs 48 may also support LUN snapshot operations, such as snapshot or revert to specific snapshot, and setting of multipathing configuration, such as preferred path. The UTM LUNs 48 may also facilitate collection of statistics by obtaining logs from the storage array that can be used for troubleshooting and the like.

In one embodiment, the management subsystem module 40 exposes a compute and storage abstraction to the user. In particular, the management subsystem module 40 provides a single point of management for compute and storage provisioning. As previously noted, the storage requirements may be encapsulated in a "service profile" logical entity that is defined independently of the underlying hardware. The service profile is used to specify the amount of storage required, whether storage is dedicated to a single server or shared across multiple servers, and availability and performance requirements. In accordance with embodiments described herein, from the high-level requirements set forth in the service profile, the management subsystem module 40 derives configuration rules for FC zoning, LUN creation, and LUN masking and applies them as will be described in detail below.

Virtualized adapters, such as the virtualized adapter 42, have the ability to instantiate multiple FC vHBAs, such as vHBAs 50A-50D, and multiple Ethernet virtual network interface cards ("vNICS"), such as VNICs 52A and 52B, from the same physical adapter (i.e., adapter 42). The hardware of the virtualized adapter 42 can control whether or not a vHBA is exposed to the operating system ("OS") 54. In one embodiment, the OS 54 may comprise a bare metal hypervisor. In another embodiment, such as that illustrated in FIG. 2, the OS 54 may be implemented on bare metal, in which case a hypervisor (not shown) would be implemented on top of the OS 54. In either case, in a standard SAN deployment, the virtualized adapter instantiates one or more vHBAs on the server. vHBAs exposed to the bare-metal OS or hypervisor are used to send and receive FC traffic. In one embodiment, in addition to the standard vHBAs provisioned for data traffic (i.e., vHBAs 50A, 50B) between the server 36 and storage array 38, a new type of vHBA, referred to herein as a management vHBA, may be provisioned for control traffic. vHBAs 50C and 50D are management vHBAs ("MvHBAs"). MvHBAs are transparent to the OS 54 and are used to perform storage provisioning tasks on the SANs 44. Such storage provisioning tasks may include LUN creation and LUN masking. Since the storage provisioning is performed from a vHBA dynamically instantiated on a virtual adapter, there is no need to dedicate a management station to perform storage provisioning.

Once the MvHBAs 50C, 50D, have been instantiated, the management subsystem module 40 sends requests over the MvHBAs to the UTM LUNs 48 on the SANs 44. A storage provisioning module 56 can send storage configuration requests, such as creating a LUN or masking a LUN, to the UTM LUNs 48, via the respective MvHBAs 50C, 50D. To this end, the management subsystem module 40 assigns a virtual port WWN to each MvHBA and ensures regular vHBAs are not configured with the port WWN of the MvHBA.

In one implementation, as illustrated in FIG. 2, the storage provisioning module 56 is implemented on the virtualized adapter 42. In this implementation, the storage provisioning module may be embedded in or uploaded directly onto the virtualized adapter. In this implementation, storage provisioning can be performed even when all physical servers have been assigned to regular workload tasks.

Figure 3:
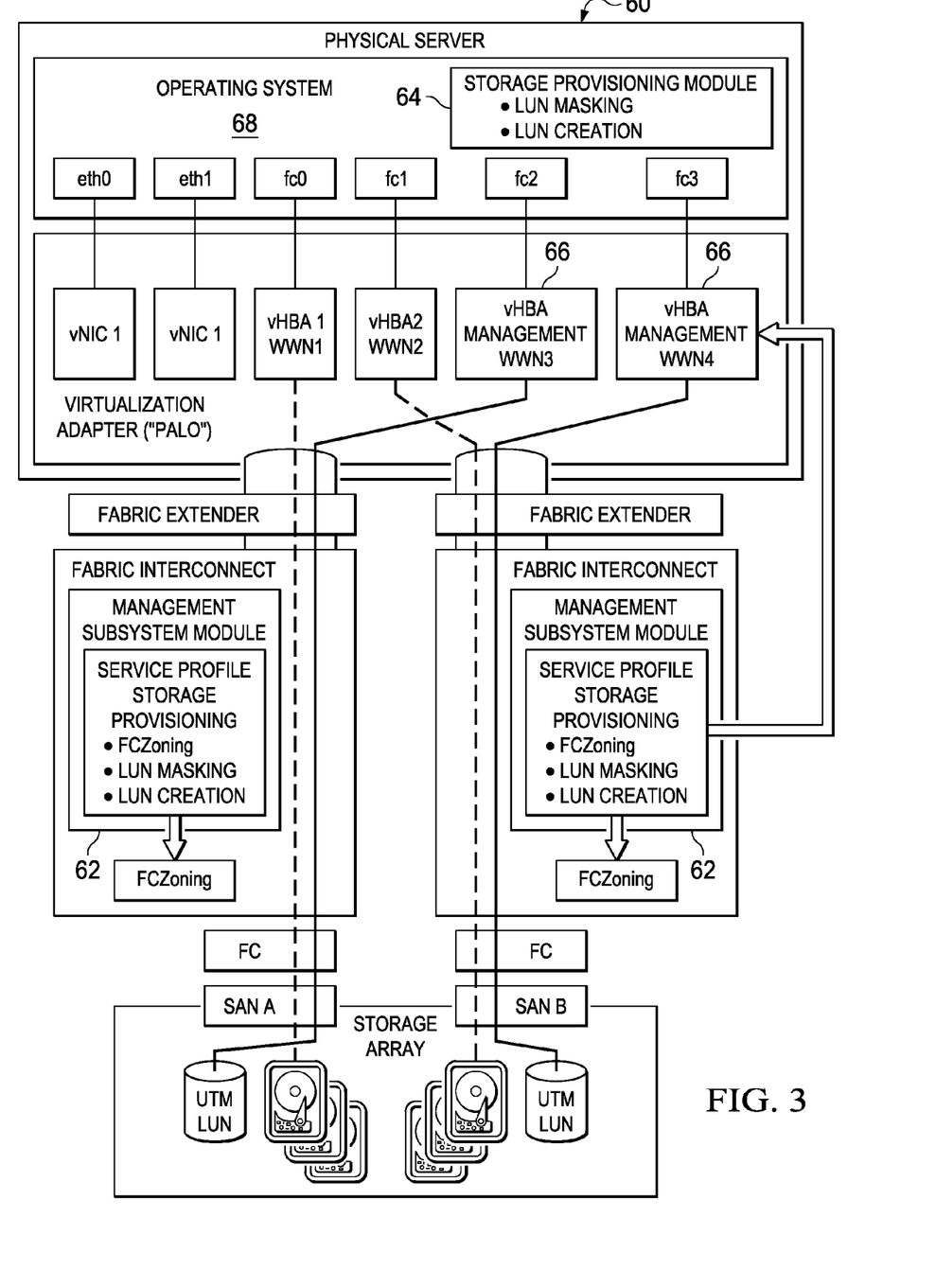
FIG. 3 is a detailed block diagram of a system for implementing in-band LUN provisioning in a data center network environment in accordance with an alternative embodiment.

In another implementation, as illustrated in FIG. 3, in which the server is a physical server, storage provisioning can be performed temporarily using a server 60 from a pool of unused servers. In this embodiment, a management subsystem module 62 may install a storage provisioning module 64 on the server 60 in a manner similar to that used for Processor Node Utility Operating System ("PNuOS"), which serves as a pre-OS configuration agent for blade servers in UCS. The storage provisioning module 64 executing on the server may access MvHBAs 66, which are exposed to an OS 68 of the server 60.

Figure 4:
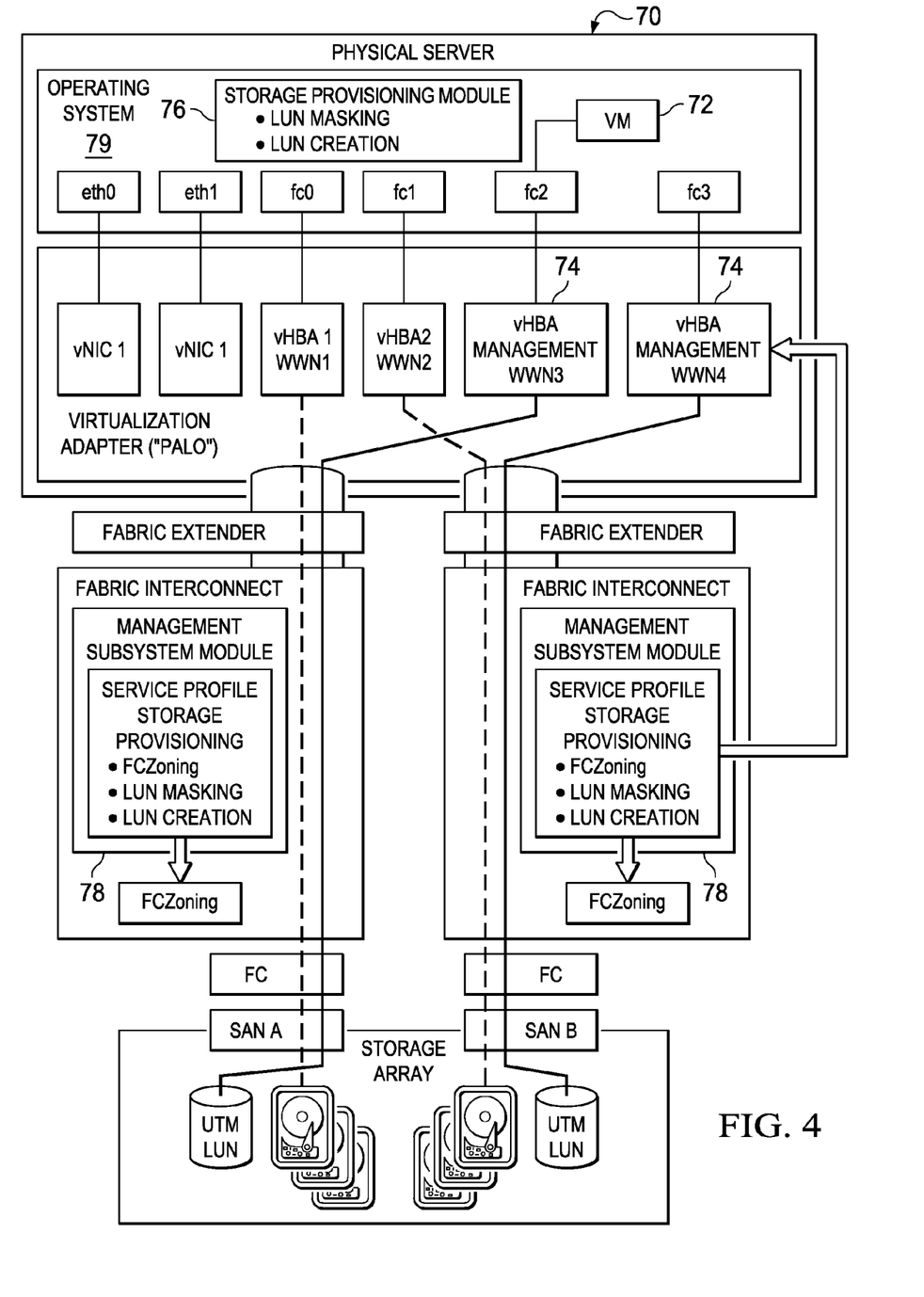
FIG. 4 is a detailed block diagram of a system for implementing in-band LUN provisioning in a data center network environment in accordance with an alternative embodiment.

In yet another example implementation, as illustrated in FIG. 4, storage provisioning for a server 70 may be implemented by instantiating on the server a VM 72 that has access to an MvHBA 74. A server provisioning module 76 is installed by a management subsystem module 78 on the VM 72. As a prerequisite, the hypervisor running on the server 70 should support exposing vHBAs to VMs in this embodiment. Similar to the implementation illustrated in FIG. 3, in the implementation of FIG. 4, the MvHBA 74 is exposed, as opposed to transparent, to a bare metal OS or hypervisor 79 of the server 70.

It will be noted that a one-time manual setup may be required to mask the UTM LUN to the port WWN(s) assigned to the MvHBA. This permits traffic between each of the MvHBAs and the respective UTM LUN. Once the initial setup has been performed, subsequent LUN provisioning operations, including LUN creation and LUN masking, for example, may be automated through the MvHBAs.

In one embodiment, the system may ensure that no component other than the MvHBAs can perform SAN provisioning through the UTM LUN. Additionally, the system may ensure that only trusted components can access the MvHBA. The management subsystem module can assign a virtual port WWN to the MvHBA and ensure that regular vHBAs are not configured with the port WWN of the MvHBA. In cases in which the bare metal OS or hypervisor is not trusted, the system can ensure that the MvHBAs are not exposed to the OS/hypervisor. In cases in which a management application is loaded onto the server on which the MvHBA is running, the system may ensure that the management application is loaded in a trusted environment. In-band LUN provisioning can provide a security benefit in cases in which the fabric interconnect is physically connected to the storage array. In such cases, LUN provisioning is confined to the system composed of the fabric interconnect and the storage array; there is no need to expose LUN provisioning to the out-of-band interface.

Figure 5:
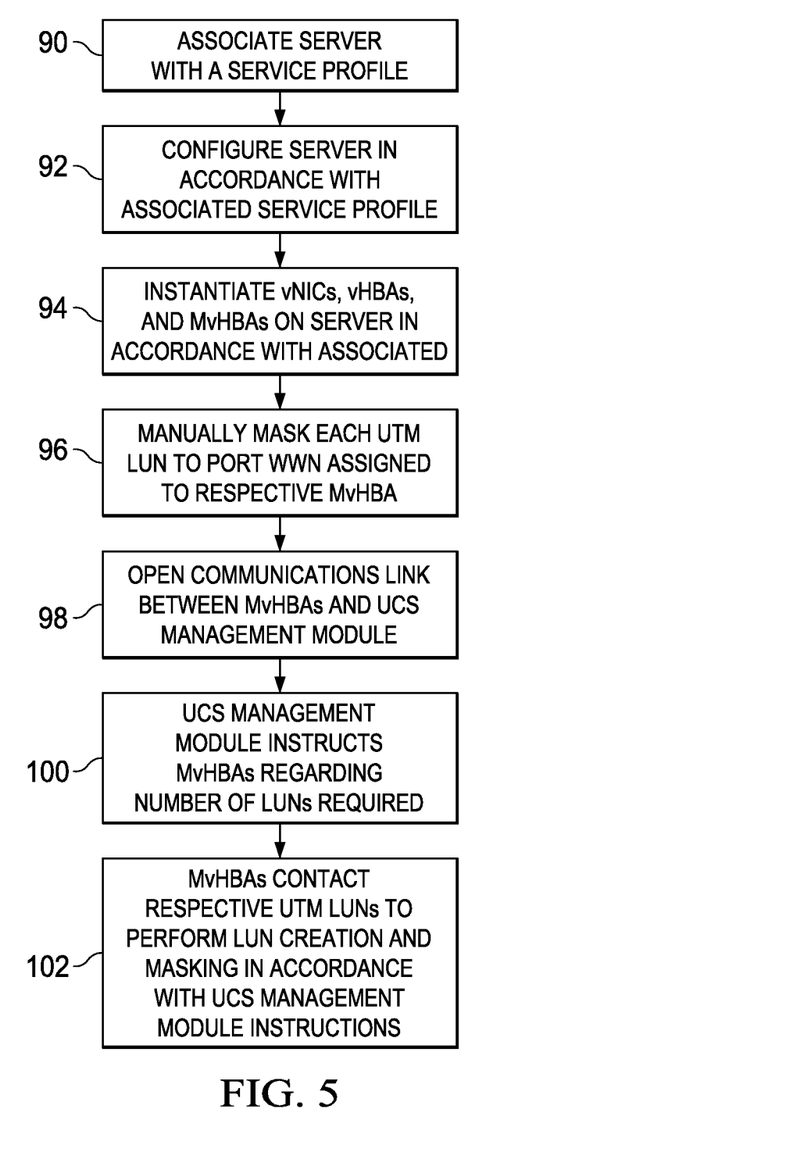
FIG. 5 is a flowchart illustrating a method for implementing in-band LUN provisioning in a data center network environment in accordance with one embodiment.

FIG. 5 is a flowchart illustrating a method for implementing in-band LUN provisioning in a data center network environment in accordance with one embodiment. In step 90, a newly-installed server is associated with a service profile. In step 92, a UCS management module configures the server to inherit properties specified in the associated service profile. In particular, the service profile may specify how many CPUs, how much memory, how many vNICs (as well as a MAC address for each), how many vHBAs (as well as a WWN address for each), BIOS version, BIOS parameters, and what VLAN and/or VSAN connectivity the server should have.

In step 94, the management subsystem module instantiates the specified number of vHBAs, vNICs, and MvHBAs on the server in accordance with the associated service profile. In step 96, a one-time manual setup is performed in connection with the MvHBAs to mask each UTM LUN to the port WWN assigned to a respective one of the MvHBAs. In step 98, a communications link is opened between the management subsystem module and each of the newly instantiated MvHBAs. In accordance with features of embodiments described herein, the service profile may specify storage properties of the server; that is, how many disks to expose to the server and the capacity of those disks, as well as whether access to the disks should be shared with other servers or exclusive to the particular server and a RAID level of the disks. Other storage properties that may be specified include information regarding optimization of disk space using deduplication and controlling backup and whether to take storage snapshots. In step 100, the management subsystem module instructs the storage configuration module as to a number of LUNs to create, in accordance with the specifications in the service profile. In step 102, the storage configuration module communicates with the UTM LUNs via respective MvHBAs to create and mask the requested number of LUNs, as well as to perform other storage configuration activities as specified by the service profile.

The elements and processes described hereinabove may also be used to remove LUNs, with the caveat that this could result in problems if the OS is using a disk that is removed. The elements and processes could also be used to dynamically change storage provisioning, as well as decommissioning and migrating a server (e.g., in response to a virus).

In the past, storage configuration has been performed manually at the storage array. In particular, each port on storage array has an address that had to be configured, at which point zoning was performed at the FC switch. Masking was also manually performed. In contrast, in accordance with features described herein, storage configuration is performed dynamically using the storage configuration information set forth in the service profile. If later, LUN is added or deleted or physical server on which service profile was running is dying, can dynamically configure replacement.

The embodiments illustrated herein are shown as including two fabric interconnects working in high availability mode; however, it is possible that only a single fabric interconnect could be provided, at the risk of complete loss of access to the data path should the fabric fail. Additionally, different models of fabric interconnects can be employed and physical servers may include more than one virtualized adapter, depending on OS limits. One or many storage arrays (up to the number of physical ports available on the fabric interconnect employed) may be provided. The storage array(s) may be connected to fabric interconnect(s) either directly or via a FC switch, such as an MCS switch or a Nexus 5000 series switch available from Cisco Systems, Inc. In the embodiments illustrated herein, the storage array is directly connected to the fabric interconnect; in alternative embodiments, the storage array could be connected through FC or Ethernet fabric.

As described in detail above, embodiments of the disclosure provide methods to provision LUNs on a storage array using in-band management via a virtualized FC adapter. The user may define and apply storage policies in a manner that greatly reduces the number of provisioning and maintenance operations required to be performed manually. The embodiments described herein are particularly well suited to a virtualized and stateless computing environment in which logical servers are associated with physical servers and the association can change over time. The system automatically provisions LUNS and performs LUN masking according to the storage policy.

The embodiments described herein advantageously encapsulate the storage requirements of a server in a storage policy that is applied to logical servers. The storage provisioning is performed from a single management endpoint; as a result, there is no need for coordination between server administrators and storage administrators. Additionally, LUN provisioning and LUN masking can be performed in-band without involving a third party management endpoint. The initial configuration requires a single data entry (i.e., the WWN of the MvHBA), which can be further simplified by obtaining the WWN from a pool of available WWNs. Moreover, a single RBAC module includes compute, network, and storage provisioning. FC zoning and LUM masking configuration is automatically applied and follows any change to the physical infrastructure, including, for example, replacement of a physical server or a change in association between a logical server and a physical server. Still further, storage policies are expressed using a high-level representation; that is, storage exposed to the servers, rather than the traditional FC zones and LUN masking rules that contain device identifiers (such as a zone containing WWN identifiers). Finally, LUN masking can be configured using early or late binding.

It should be noted that much of the infrastructure discussed herein can be provisioned as part of any type of network device. As used herein, the term "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the management activities discussed herein. This could include the implementation of instances of any of the components, engines, logic, etc. shown in FIGS. 1-4. Additionally, each of these devices can have an internal structure (e.g., a processor, a memory element, etc.) to facilitate some of the operations described herein. In other embodiments, these management activities may be executed externally to these devices, or included in some other network device to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that in certain example implementations, functions outlined herein may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as may be inherent in several devices illustrated in FIGS. 1-4, including, for example, servers, fabric interconnects, and virtualized adapters, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as may be inherent in several devices illustrated in FIGS. 1-4, including, for example, servers, fabric interconnects, and virtualized adapters, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that systems illustrated in FIGS. 1-4 (and its teachings) are readily scalable and can accommodate a large number of components, as well as more complicated/sophisticated arrangements and configurations. Accordingly, the examples provided should not limit the scope or inhibit the broad teachings of illustrated systems as potentially applied to a myriad of other architectures.

It is also important to note that the steps in the preceding flow diagrams illustrate only some of the possible signaling scenarios and patterns that may be executed by, or within, the illustrated systems. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the illustrated systems in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   instantiating a virtual adapter on a network device connected to a storage array, the virtual adapter capable of communicating with the storage array, wherein the network device comprises a server for hosting virtual machines and the virtual adapter comprises a virtual host bus adapter ("vHBA") that is transparent to an operating system of the server;
   determining storage configuration properties for the network device; and
   provisioning a portion of the storage array to the network device in accordance with the determined storage configuration properties.

2. The method of claim 1, further comprising associating the network device with a service profile, wherein the storage configuration properties are specified in the service profile.

3. The method of claim 2, further comprising configuring the network device in accordance with the associated service profile, wherein the instantiating is also performed in accordance with the associated service profile.

4. The method of claim 1, wherein the determining further comprises accessing a service profile associated with the network device, wherein the service profile specifies the storage configuration properties for the network device.

5. The method of claim 1, wherein the provisioning further comprises accessing a universal transport mechanism ("UTM") logical unit number ("LUN") of the storage array to perform LUN creation and masking.

6. The method of claim 5, wherein the accessing is performed by the virtual adapter via an in-band connection between the network device and the storage array.

7. The method of claim 1, wherein the storage configuration properties include at least one of:
   an amount of storage to be provisioned to the network device;
   a number of disks of the storage array to expose to the network device;
   a capacity of each disk of the storage array exposed to the network device;
   whether access to each disk of the storage array exposed to the network device should be shared or exclusive;
   a RAID level of each disk of the storage array exposed to the network device; and
   information regarding optimization of disk space use.

8. Logic encoded in one or more non-transitory tangible media that includes code for execution and when executed by a processor is operable to perform operations comprising:
   instantiating a virtual adapter on a network device connected to a storage array, the virtual adapter capable of communicating with the storage array, wherein the network device comprises a server for hosting virtual machines and the virtual adapter comprises a virtual host bus adapter ("vHBA") that is transparent to an operating system of the server;
   determining storage configuration properties for the network device;
   provisioning a portion of the storage array to the network device in accordance with the determined storage configuration properties.

9. The logic of claim 8, wherein the determining further comprises associating the network device with a service profile, wherein the storage configuration properties are specified in the service profile.

10. The logic of claim 9, further comprising configuring the network device in accordance with the associated service profile, wherein the instantiating is also performed in accordance with the associated service profile.

11. The logic of claim 8, wherein the determining further comprises accessing a service profile associated with the network device, wherein the service profile specifies the storage configuration properties for the network device.

12. The logic of claim 8, wherein the provisioning further comprises accessing a universal transport mechanism ("UTM") logical unit number ("LUN") of the storage array to perform LUN creation and masking.

13. The logic of claim 12, wherein the accessing is performed by the virtual adapter via an in-band connection between the network device and the storage array.

14. The logic of claim 8, wherein the storage configuration properties include at least one of:
   an amount of storage to be provisioned to the network device;
   a number of disks of the storage array to expose to the network device;
   a capacity of each disk of the storage array exposed to the network device;
   whether access to each disk of the storage array exposed to the network device should be shared or exclusive;
   a RAID level of each disk of the storage array exposed to the network device; and
   information regarding optimization of disk space use.

15. An apparatus comprising:
   a memory element configured to store data;
   a processor operable to execute instructions associated with the data; and
   a storage configuration module coupled to the processor and the memory element such that the apparatus is configured to:
      instantiate a virtual adapter on a network device connected to a storage array, the virtual adapter capable of communicating with the storage array, wherein the network device comprises a server for hosting virtual machines and the virtual adapter comprises a virtual host bus adapter ("vHBA") that is transparent to an operating system of the server;
      determine storage configuration properties for the network device; and
      provision a portion of the storage array to the network device in accordance with the determined storage configuration properties.

16. The apparatus of claim 15, wherein the storage configuration properties are specified in a service profile associated with the network device.

17. The apparatus of claim 15, wherein storage configuration module is further configured to access a universal transport mechanism ("UTM") logical unit number ("LUN") of the storage array to perform LUN creation and masking.

18. The apparatus of claim 15, wherein the storage configuration properties include at least one of:
   an amount of storage to be provisioned to the network device;
   a number of disks of the storage array to expose to the network device;
   a capacity of each disk of the storage array exposed to the network device;
   whether access to each disk of the storage array exposed to the network device should be shared or exclusive;
   a RAID level of each disk of the storage array exposed to the network device; and
   information regarding optimization of disk space use.

* * * * *